(No Model.)
G. W. WEISS.
REGULATING OR ADJUSTING DEVICE FOR BRACE BITS.
No. 585,456. Patented June 29, 1897.
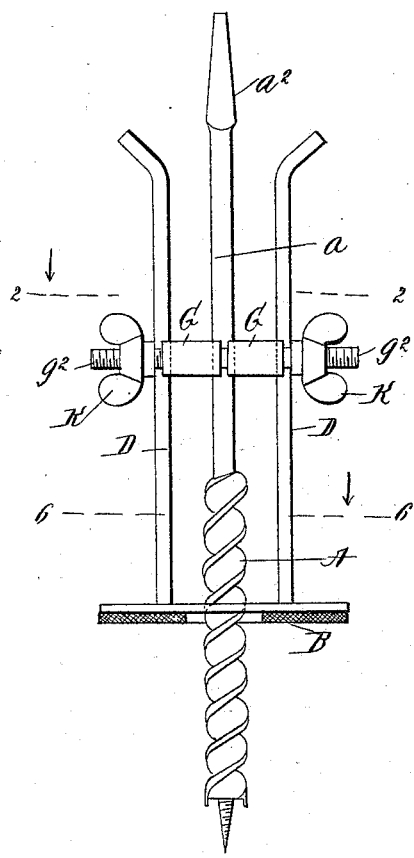
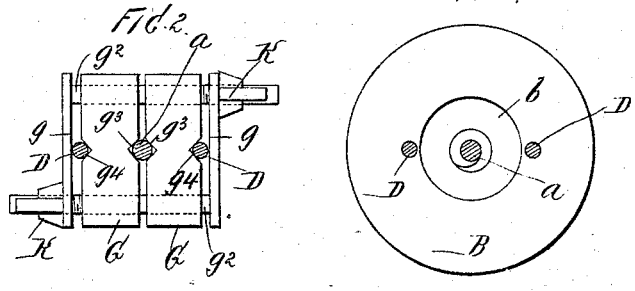
WITNESSES:
John Buckler,
C. Gerst
INVENTOR
George W. Weiss,
BY
Edgar Tate & Co.
ATTORNEYS.

UNITED STATES PATENT OFFICE.

GEORGE W. WEISS, OF BROOKLYN, NEW YORK.

REGULATING OR ADJUSTING DEVICE FOR BRACE-BITS.

SPECIFICATION forming part of Letters Patent No. 585,456, dated June 29, 1897.

Application filed March 18, 1896. Serial No. 583,711. (No model.)

*To all whom it may concern:*

Be it known that I, GEORGE W. WEISS, a citizen of the United States, and a resident of Brooklyn, in the county of Kings and State of New York, have invented certain new and useful Improvements in Regulating or Adjusting Devices for Brace-Bits, of which the following is a specification, reference being had to the accompanying drawings, forming a part thereof, in which similar letters of reference indicate corresponding parts.

This invention relates to regulating or adjusting devices for brace-bits, augers, and similar articles such as are usually employed in boring frames and various articles; and the object of the invention is to provide an attachment for such bits whereby the length thereof or the depth of the boring may be regulated to suit any desired requirements.

The invention is fully disclosed in the following specification, of which the accompanying drawings form a part, in which—

Figure 1 is a side view of a bit provided with my improved adjusting device; Fig. 2, a section thereof on the line 2 2, and Fig. 3 a section on the line 6 6 of Fig. 1.

In the drawings forming part of this specification, A represents an ordinary screw-bit provided with a shank $a$ and a head $a^2$, which is adapted to be connected with the usual brace or stock, and in the practice of my invention I provide an adjusting device which is adapted to be connected with the shank of the bit and by means of which the depth of the hole bored thereby may be regulated as desired. This adjusting device consists of an annular plate B, which is provided with a central opening through which the bit passes and with two vertical side bars or legs D, and I also employ two clamping-jaws G and two side plates $g$, to each of which is secured a rod or bolt $g^2$, which are passed through the opposite ends of the jaws G and through the adjacent end of the side plates $g$, and the outer end of each is screw-threaded and provided with a set-nut K. As thus connected the jaws G are free to slide upon the rods or bolts $g^2$, and the plates $g$ may be separated as widely as necessary, and the jaws G are provided in their adjacent sides or faces with notches or recesses $g^3$, which form a central passage for the shank $a$ of the bit A, and formed in the opposite sides of said jaws are similar notches or recesses $g^4$, through which the rods or bars D pass, and by means of the set-nuts K the plates $g$ and the jaws G may be securely clamped together and also clamped to the shaft $a$ of the bit A and to the rods or bars D, and by this means the position of the plate B may be regulated at will, and, as will be observed, the depth of the bore which it is desired to make by the bit A may be also similarly regulated.

This device is simple in construction and operation and perfectly adapted to accomplish the result for which it is intended and is comparatively inexpensive.

I also secure to the bottom of the plate B a washer of felt or other material to prevent injuring the surface of the wood, and, as will be apparent, the clamping-jaws may be adjusted on the bit or auger shank, and said plate B may also be adjusted on said jaws, and thus a double adjustment is provided for, and in the construction shown the distance between the rods D is sufficient to allow them to pass over a stock or brace, and this is also true of the construction shown in Fig. 1 under certain conditions. It will also be observed that the entire adjusting device consists of one part or instrumentality, thus preventing the loss thereof, and at the same time is centered on the shank of the bit or auger by simply adjusting the set-screws.

The various forms of construction herein shown and described are adapted for use in connection with an auger, a bit, or similar article in almost any relation, and it is evident that other changes in and modifications of my improvement may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

An adjusting device for regulating the depth of the bore made by a bit, said adjusting device being adapted to be connected with the shank of the bit, and comprising two laterally-movable jaws, through which the shank of the bit is adapted to be passed, said jaws being connected by means of bolts which pass therethrough and which are provided with set-screws, and said bolts being provided with side plates, and the adjusting device being also provided with vertical arms which are passed between said side plates, and said jaws, and the lower ends of which are provided with a circular plate through which the bit passes, substantially as shown and described.

In testimony that I claim the foregoing as my invention I have signed my name, in presence of the subscribing witnesses, this 13th day of February, 1896.

GEORGE W. WEISS.

Witnesses:
C. GERST,
B. RHEDER.